(12) United States Patent
Wernersson et al.

(10) Patent No.: US 11,190,313 B2
(45) Date of Patent: Nov. 30, 2021

(54) REFERENCE SIGNALING FOR BEAMFORMING NETWORKS

(71) Applicant: Telefonaktiebolaget LM Ericsson (publ), Stockholm (SE)

(72) Inventors: Niklas Wernersson, Kungsängen (SE); Svante Bergman, Hägersten (SE); Nima Seifi, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 32 days.

(21) Appl. No.: 15/746,463

(22) PCT Filed: Jul. 22, 2015

(86) PCT No.: PCT/SE2015/050830
§ 371 (c)(1),
(2) Date: Jan. 22, 2018

(87) PCT Pub. No.: WO2017/014683
PCT Pub. Date: Jan. 26, 2017

(65) Prior Publication Data
US 2018/0219659 A1    Aug. 2, 2018

(51) Int. Cl.
*H04L 5/00* (2006.01)
*H04B 7/06* (2006.01)
*H04B 7/024* (2017.01)

(52) U.S. Cl.
CPC ........ *H04L 5/0048* (2013.01); *H04B 7/024* (2013.01); *H04B 7/0617* (2013.01); *H04B 7/0626* (2013.01); *H04B 7/0695* (2013.01); *H04L 5/0062* (2013.01)

(58) Field of Classification Search
CPC ... H04L 5/0048; H04L 5/0062; H04B 7/0626; H04B 7/024; H04B 7/0617; H04B 7/0695
See application file for complete search history.

(56) References Cited

U.S. PATENT DOCUMENTS

| | | | |
|---|---|---|---|
| 2013/0156120 A1* | 6/2013 | Josiam | H04L 5/0023 375/260 |
| 2014/0073337 A1* | 3/2014 | Hong | H04W 16/28 455/452.1 |
| 2015/0200755 A1 | 7/2015 | Hammarwall et al. | |
| 2015/0208388 A1 | 7/2015 | Yijian | |

(Continued)

FOREIGN PATENT DOCUMENTS

| | | |
|---|---|---|
| CN | 102355292 A | 2/2012 |
| WO | 2013137794 A1 | 9/2013 |

(Continued)

OTHER PUBLICATIONS

Krim, Hamid et al., "Two Decades of Array Signal Processing Research", IEEE Signal Processing Magazine, Jul. 1996, 67-94.

(Continued)

*Primary Examiner* — Harry H Kim
(74) *Attorney, Agent, or Firm* — Sage Patent Group

(57) ABSTRACT

There is disclosed a method for operating a transmitting node of a wireless communication network, the transmitting node being adapted for a plurality of beamforming states, wherein the method comprises transmitting reference signaling based on a beamforming state of the transmitting node. There are also disclosed related nodes and methods.

12 Claims, 10 Drawing Sheets

(56) References Cited

U.S. PATENT DOCUMENTS

| | | | | |
|---|---|---|---|---|
| 2016/0006122 A1* | 1/2016 | Seol | ............... | H04B 7/0408 |
| | | | | 342/372 |
| 2016/0065294 A1* | 3/2016 | Kang | ............... | H04B 7/0695 |
| | | | | 370/334 |
| 2017/0127350 A1* | 5/2017 | Adjakple | ......... | H04W 52/0206 |

FOREIGN PATENT DOCUMENTS

| | | | |
|---|---|---|---|
| WO | 2014/062195 A1 | 4/2014 | |
| WO | 2014137043 A1 | 9/2014 | |
| WO | 2015080648 A1 | 6/2015 | |

OTHER PUBLICATIONS

European Office Action issued in corresponding EP Application No. 15747583.1; dated Feb. 11, 2019; 09 pages.
Office Action issued in corresponding EP Application No. 15747583.1; dated Sep. 23, 2019; 06 Pages. All references cited therein have been previously made of record.
Office Action issued in corresponding EP Application No. 15747583.1 dated Mar. 5, 2020, 08 Pages. The reference not cited herein has previously been made of record.
European Office Action issued in corresponding EP Application No. 15747583.1 dated Oct. 22, 2020, 08 Pages. The reference cited therein has previously been made of record.

* cited by examiner

REFERENCE SIGNALING FOR BEAMFORMING NETWORKS

TECHNICAL FIELD

The present disclosure pertains to reference signaling, in particular in wireless communication systems adapted for beam forming.

BACKGROUND

In many wireless communication systems, reference signaling is provided by a network to allow estimation of channel quality. In systems utilizing beamforming, in particular with multiple beamforming nodes, the use of reference signaling may become increasingly complicated. There are needed improved approaches of reference signaling in such context.

SUMMARY

There is disclosed a method for operating a transmitting node of a wireless communication network. The transmitting node is adapted for a plurality of beamforming states. The method comprises transmitting reference signaling based on a beamforming state of the transmitting node.

There is also disclosed a transmitting node for a wireless communication network. The transmitting node is adapted for a plurality of beamforming states. The transmitting node is further be adapted for transmitting reference signaling based on a beamforming state of the transmitting node.

Moreover, there is disclosed a method for operating a referencing node of a wireless communication network, the method comprising transmitting information pertaining to received reference signaling based on a beamforming state indication.

In addition, there is disclosed a referencing node for a wireless communication network. The referencing node may be adapted for, and/or comprise an information transmitting module for, transmitting information pertaining to received reference signaling based on a beamforming state indication.

Moreover, there is disclosed a method for operating a configuring node of a wireless communication network, the method comprising configuring a second node of the wireless communication network for reference signaling based on a beamforming state.

There is also disclosed a configuring node for a wireless communication network the configuring node being adapted for configuring a second node for the wireless communication network for reference signaling based on a beamforming state.

There is also disclosed a program product comprising instructions causing control circuitry to control and/or perform any of the methods disclosed herein, in particular when executing the instructions.

There is also disclosed a storage medium storing a program product disclosed herein. The storage medium may be readable by control circuitry, e.g. control circuitry of a radio node.

By basing reference signaling on a beamforming state, the channel quality estimation respectively reference measurements may be improved, allowing improved operation in particular of strongly beamforming systems.

DETAILED DESCRIPTION

Figure 1:
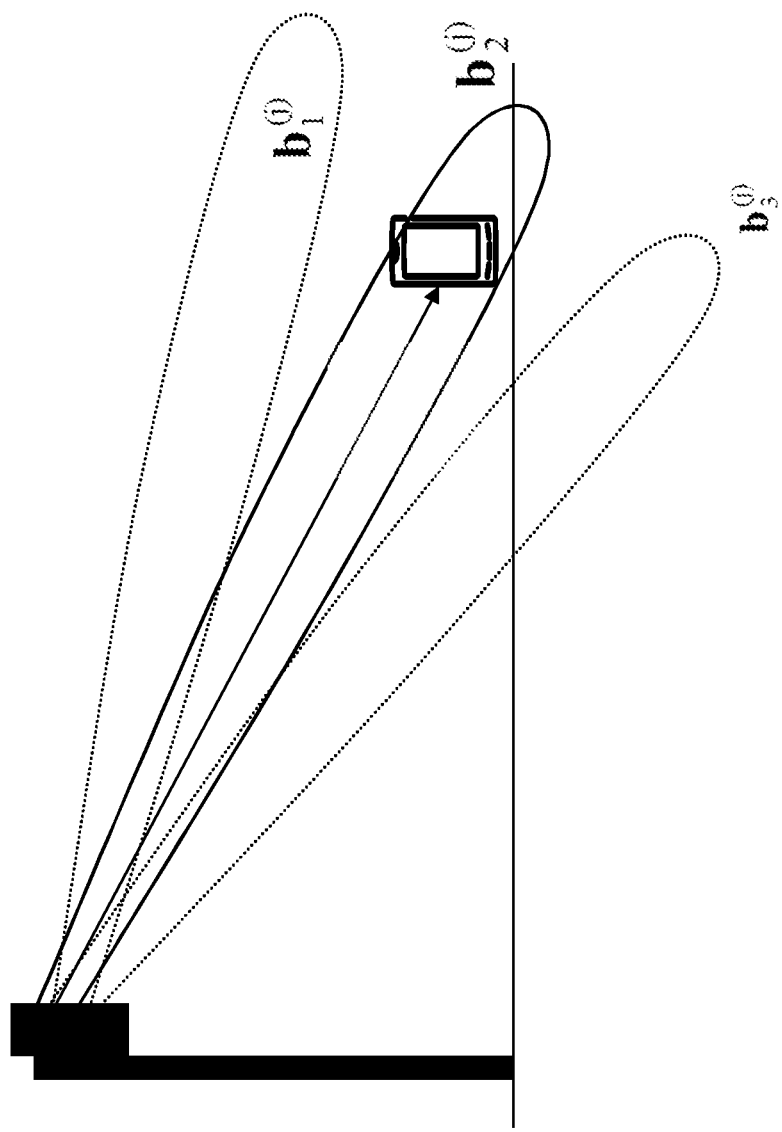
FIG. 1 shows an example of beam selection.

There is disclosed a method for operating a transmitting node of a wireless communication network. The transmitting node may be adapted for a plurality of beamforming states. It may be considered that the method comprises transmitting reference signaling based on a beamforming state of the transmitting node. The method may comprise performing link adaptation and/or modulating and encoding signals based on information received from a referencing node receiving the reference signaling. The information received may pertain to received (from the transmitting node) reference signals.

There is also disclosed a transmitting node for a wireless communication network. The transmitting node may be adapted for a plurality of beamforming states. The transmitting node may further be adapted for, and/or comprise a transmitting module for, transmitting reference signaling based on a beamforming state of the transmitting node. The transmitting node may be adapted for performing link adaptation and/or modulating and encoding signals based on information received from a referencing node receiving the reference signaling. The information received may pertain to received (from the transmitting node) reference signals.

Link adaptation and/or modulating and encoding signals generally may be based on information received from the referencing node and/or on information and/or instruction received from a coordinating node, which may obtain information pertaining to reference signaling from one or more referencing nodes, e.g. via one or more radio nodes like transmitting nodes and/or configuring nodes.

Accordingly, reference signaling may be suitably targeted at a receiver, e.g. a referencing node.

Reference signaling may generally comprise CSI-RS signaling. This kind of signaling is particularly suitable for LTE-based and related systems.

Transmitting, e.g. of reference signaling, may be performed based on a mapping between beamforming states of the transmitting node and associated reference signaling. Such a mapping may provide an easy reference which reference signaling to use. A mapping may be stored in a memory of the transmitting node, e.g. in form of a table and/or associated to a codebook.

A transmitting node may generally be a radio or network node, in particular a base station like an eNodeB. A transmitting node may be defined by its functionality of transmitting reference signaling. It may be considered that a transmitting node comprises and/or is connected or connectable to one or more beamformers and/or beamformer modules.

Transmitting based on a beamforming state may comprise transmitting based on a current beamforming state, in particular in terms of beam direction, whether a beam it turned on or off, whether more than one beam is switched on or off, etc. Alternatively or additionally, it may be based on expected and/or future beamforming states and/or scheduling, e.g. taking into account that until the transmitting process (e.g. modulating and/or encoding) takes time in which the beamforming state may change.

Generally, transmitting reference signaling may be performed utilizing beamforming, in particular using a beam covering a referencing node. It may be considered that transmitting reference signaling comprises transmitting to and/or for a referencing node.

Moreover, there is disclosed a method for operating a referencing node of a wireless communication network, the method comprising transmitting information pertaining to received reference signaling based on a beamforming state indication.

In addition, there is disclosed a referencing node for a wireless communication network. The referencing node may be adapted for, and/or comprise an information transmitting module for, transmitting information pertaining to received reference signaling based on a beamforming state indication.

The information transmitted thus may reflect the beamforming state as indicated by the beamforming state indication.

A referencing node may be adapted for a plurality of beamforming states, in particular for reception.

Information pertaining to received reference signaling may be information indicative of measurements (and/or results of such measurements) performed on the reference signaling, in particular pertaining to received signal strength and/or SNR (Signal-to-Noise-Ratio) and/or SIR (Signal-to-Interference-Ratio) and/or SINR (Signal-to-Interference-and-Noise-Ratio). The information may be based on such measurement/s, in particular may represent estimation/s and/or calculation/s and/or concatenation performed on the measurement results. Transmitting such information may comprise performing one or more estimation and/or calculation and/or concatenation actions on such measurement results, e.g. by a result treatment module of the referencing node. Such actions may be performed according to a configuration and/or be configured e.g. by a configuring node.

Alternatively or additionally, the information may comprise channel quality information (CQI), in particular as described herein. The information may generally be transmitted in the form of one or more messages and/or signals. It may be considered that information pertaining to received reference signaling comprises a recommendation for transmission characteristics to a transmitting node and/or network. Generally, the information pertaining to received reference signaling may be transmitted to and/or intended for the transmitting node from which the reference signaling was received. Alternatively or additionally, the information may be transmitted to and/or be intended for one or more other radio nodes or network nodes, e.g. base stations and/or eNodeBs. Information pertaining to received reference signaling may be referred to as measurement response and/or response and/or be represented by channel quality information (CQI), which may comprise, e.g. CSI and/or other parameters identified herein.

The beamforming state indication may be based on a configuration of the referencing node. The configuration may be performed by a configuring node, in particular by a transmitting node operating as configuring node before transmitting the reference signaling. Accordingly, the referencing node may be configured suitably for receiving the reference signaling and/or performing measurements thereon.

Generally, the beamforming state indication may be obtained by the referencing node, e.g. from a memory and/or based on information received from a configuring node and/or transmitting node and/or based on an estimate and/or calculation, e.g. performed by the referencing node and/or an indication determining module of the referencing node.

The beamforming state indication may comprise an indication of an interference state. The interference state may reflect interference measured and/or estimated and/or calculated, e.g. based on a beamforming state, e.g. overlap of beams. The indication may indicate a current and/or future and/or expected beamforming state, e.g. a state at a predetermined time. It may be considered that the beamforming state indication indicates a time evolution of a beamforming state and/or a schedule of expected and/or planned beamforming states.

Generally, a beamforming state indication may be and/or comprise a message and/or signal indicating a beamforming state, in particular a beamforming state of a transmitting node. The indication may be received and/or receivable from a transmitting node and/or pertain to a beamforming state of a transmitting node.

A referencing node may generally be a radio node, in particular a terminal or user equipment. A referencing node may be defined by its functionality of receiving reference signaling and/or transmitting information pertaining to received reference signaling. It may be considered that a receiving node comprises and/or is connected or connectable to one or more beamformers and/or beamformer modules.

Moreover, there is disclosed a method for operating a configuring node of a wireless communication network, the method comprising configuring a second node of the wireless communication network for reference signaling based on a beamforming state.

There is also disclosed a configuring node for a wireless communication network the configuring node being adapted for configuring a second node for the wireless communication network for reference signaling based on a beamforming state.

The second node thus may be prepared and/or configured for dealing with reference signaling based on the beamforming state.

The second node may be configured for receiving reference signaling and/or with a reference measurement configuration. The configuration may be based on a beamforming state of a transmitting node.

It may be considered that the second node is configured for transmitting information based on received reference signaling.

Generally, configuring a second node for reference signaling may comprise configuring the second node for receiving reference signaling and/or transmitting information pertaining to received reference signaling, e.g. such information as discussed herein.

A configuring node may generally be a radio node or network node, in particular a base station like an eNodeB. A configuring node may be defined by its functionality of configuring a second node. It may be considered that a configuring node comprises and/or is connected or connectable to one or more beamformers and/or beamformer modules and/or is adapted for a plurality of beamforming states.

Alternatively or additionally configuring node may configure the second node based on a beamforming state of a third node, which may be a radio node, in particular a transmitting node.

A configuring node may comprise the functionality of a transmitting node and thus a configuring node may be a transmitting node and vice versa. It may be considered that a configuring node and/or a transmitting node is a radio node, in particular a base station, e.g. an eNodeB, in particular in the context of LTE.

There is also disclosed a program product comprising instructions causing control circuitry to control and/or perform any of the methods disclosed herein, in particular when executing the instructions.

There is also disclosed a storage medium storing a program product disclosed herein. A storage medium may be readable by control circuitry. It may be considered that a storage medium comprises volatile and/or non-volatile memory or any carrier of information, in particular any form of magnetic and/or electric and/or optical storage medium, for example random access memory, read-only memory, erasable programmable memory, electrically erasable programmable memory, flash-based memory, magnetic disc memory (e.g., harddisc), CD (Compact Disc)- and/or DVD (Digital Versatile Disc)-based memory, etc.

It may be considered that signaling generally comprises on or more signals and/or symbols, e.g. CSI-RS, and/or transmission characteristics of the signals and/or symbols. Transmission characteristics may generally pertain to and/or comprise e.g. resources, e.g. time and/or frequency resource(s) for the signaling, and/or timing and/or arrangement of signals and/or symbols, and/or modulation and/or coding, e.g. error detection and/or correction coding. Reception characteristics may be seen analogously.

Transmitting signaling may comprise modulating and/or encoding the signaling, e.g. to symbols and/or for error detection and/or correction. Receiving signaling may comprise demodulating and/or decoding the signaling, e.g. from symbols and/or for error detection and/or correction.

A mapping between beamforming states of a node, e.g. a node like a transmitting node, and associated reference signaling may indicate and/or map signals and/or timing and/or symbols and/or arrangement of reference signaling to each of a plurality of beam forming states, e.g. such that to each beam forming state a specific reference signaling is associated.

Generally, to each beamforming state of the plurality of beamforming states there may be associated one reference measurement configuration of a referencing node, e.g. a CSI-process. Such a configuration may configure the referencing node with measurements to be used and/or transmission characteristics for transmitting information pertaining to received reference signaling and/or operations or actions to be performed on measurement results and/or frequency of transmitting and/or performing measurements and/or format of information pertaining to received reference signaling to be transmitted and/or which kind of information to transmit and/or with resources on which to perform measurements and/or IMRs. Measurements may be performed on reference signaling. A transmitting node and/or configuring node may be adapted for configuring a referencing node with a reference measurement configuration. Alternatively or additionally, a referencing node may be configured with a reference measurement configuration associated to the reference signaling and/or the beamforming state. A reference measurement configuration may be configured based on configuration data, which may be received from and/or transmitted by a configuring node and/or transmitting node.

A beamforming state may generally be associated to a reference measurement configuration and/or a reference signaling. Different beamforming states may be associated to different reference measurement configurations and/or reference signaling.

A beamforming state may generally describe and/or be any state in which at least one radio node (which may be a transmitting node) utilizes beam forming to form at least one beam and/or operates correspondingly and/or may describe at least one beamformer. A beamforming state generally may pertain to one or more beams and/or to one or more radio nodes and/or transmission points and/or one or more beamformers and/or be a network beamforming state. A beamforming state may pertain to the direction/s and/or shape/s of the one or more beams, and/or the presence of one or more targets, e.g. referencing nodes, and/or interference, in particular interference of beams, and/or overlap of beams, and/or transmission characteristics of the beam/s and/or reception characteristics. A beamforming state may describe or indicate beams and/or transmission points and/or beamformers switched on or off.

A node adapted for a plurality of beamforming states may be adapted to switch and/or change between the states of the plurality of states. The plurality may be adaptable and/or configurable, e.g. by adding and/or subtracting one or more states, for example based on information pertaining to received reference signaling.

Changing between beamforming states may comprise changing the form and/or direction of at least one beam and/or switching on or off at least one beam. Changing between beams and/or beamforming states and/or a direction of a beam may be performed by sweeping a beam and/or by switching on or off the beam. Generally, a beamforming state may also be called a beamformer state.

A radio node adapted for beam forming may generally be operational to perform beam forming. Such a radio node may comprise control circuitry and/or comprise and/or be connected or connectable to an antenna arrangement, which may allow beam forming. A radio node adapted for beam forming and/or performing beam forming and/or being in a beam forming state may be considered a beamformer itself, in particular if it is only connected to one antenna arrangement. A radio node comprising more than one antenna arrangement may represent one or more than one beamformer. A transmission point (TP) may generally comprise one or more beamformers, e.g. one or more radio nodes and/or antenna arrangements. A radio node adapted for a plurality of beamforming states may be considered to be such in relation to one transmission point.

A radio node adapted for a plurality of beam forming states may be adapted to participate in and/or be set and/or operate one of a plurality of different beam forming state and/or comprise and/or be connected or connectable to one or more beamformers and/or antenna arrangements. Generally, beam forming may be performed for transmitting and/or receiving signaling.

A beamformer may comprise and/or be connected or connectable to and/or be implemented based on one or more antenna arrangements. An antenna arrangement generally may comprise a plurality, in particular 2 or more than 2, e.g. 2 or a multiple of 2, antenna elements. Antenna elements of an antenna arrangement may be individually and/or separately controllable, in particular for beam forming. It may be considered that antenna elements of an antenna arrangement are associated to antenna ports, which may be controlled or controllable for beam forming.

Antenna elements may be grouped. A group of antenna elements may be associated and/or associatable to a common port. Beam forming may be performed by individually and/or separately controlling antenna elements or antenna ports. An antenna arrangement may be seen as and/or comprise antenna circuitry. Different antenna arrangements and/or beamformers may be controllable independently from each other and/or may represent and/or be part of different beamformers. To different beamformers and/or antenna arrangements, in particular if they are associated to the same node, there may be associated different sectors or sections, e.g. geographical section or sectors.

Generally, a beamformer may represent a beamforming state of a beam and/or determine the shape and/or direction of a beam. As such, a beamformer may be seen as a representation or implementation of a function forming a beam. It should be noted that a beam may have a complicated shape or form, which may have a plurality of lobes and/or side structures, e.g. a main lobe and several side lobes.

A transmission point generally may be and/or represent a locale at which one or more radio nodes, in particular transmitting nodes, and/or beamformers, in particular beamformers working in transmission, are located. For example, the locale of a radio node operating and/or comprising one or more, e.g. three, beamformers may be seen as transmission point. It should be noted that a transmission point as a point is an estimate, e.g. as a transmission point may be seen as point-like in comparison to a range or area of transmission and/or reception covered by the transmission point, but for practical reasons has a spatial extension. A transmission point may be adapted for transmission and/or reception of signaling and/or signals as described herein.

Configuring a node, e.g. a second node and/or referencing node, may comprise transmitting configuration data and/or corresponding signal/s to the node, e.g. by a configuring node. Configuring may be performed by a node itself, e.g. based on configuration data, which may be obtained from a memory and/or received from another node, in particular a configuring node. Configuring may generally comprise setting the node into a configuration and/or mode according to the configuration, e.g. pertaining to transmission and/or reception characteristics (e.g., time-frequency resources used) and/or for receiving reference signaling and/or performing measurements thereon and/or transmitting information pertaining to reference signaling. A configuration (and/or corresponding configuration data) may indicate and/or comprise actions to be performed on measurement results and/or the kind and/or frequency of measurements to be performed and/or the type and/or transmission characteristics of the information to be transmitted, e.g. pertaining to encoding and/or repetition frequency and/or frequency of transmission.

In the context of this disclosure, a transmitting node may be any node adapted for transmitting signals (also called signaling), in particular reference signaling. A transmitting node may be adapted for beam forming. Being adapted for beam forming may comprise being adapted for controlling beam forming and/or transmitting using beam forming. A transmitting node may comprise corresponding control circuitry and/or comprise and/or be connected or connectable to an antenna arrangement.

The disclosure in particular concerns the configuration of reference signaling and related interference measurement resources and CSI processes in systems working with different network beamforming states. Measurements on reference signaling may generally represent interference measurements and may be performed in the context of CSI processes.

Configuring a node for reference signaling may comprise configuring for one or more reference measurement processes like CSI and/or CQI processes.

Configuring a node for reference signaling and/or transmitting reference signaling may comprise configuring a second node or referencing node with the plurality of beamforming states of a transmitting node, which may be the transmitting node transmitting the reference signaling. Such configuring may be performed before transmitting reference signaling (which may be associated to one of the beamforming states of the plurality of beamforming states). Configuring a node with the plurality of beamforming states of another node may comprise indicating the plurality of beamforming states and/or informing the configured node about the plurality of beamforming states.

A reference measurement process may comprise performing one or more measurements, e.g. on reference signaling, and/or transmitting information pertaining to the reference signaling, in particular based on the performed measurements.

Reference signaling may generally comprise one or more signals and/or symbols, on which reference measurements may be performed. Such signals may in particular have pre-determined transmission characteristics and/or specific resources and/or signal strength associated to them, which may be indicted by reference signaling. A referencing node may perform, and/or be configured or adapted for performing, and/or comprise a measurement module for performing, measurements on received reference signaling, e.g. according to a configured reference measurement configuration. Reference signaling may comprise sounding signals or symbols and/or pilot signals or symbols and/or reference signals or symbols, in particular CSI-RS signals. A process, e.g. on a referencing node, to receive and/or measure reference signaling and/or to transmit a report based on measurement results, may be called a referencing process or in particular a CSI-process, if the referencing signaling comprises CSI signaling, in particular CSI-RS. Such a process may be based on and/or according to a reference measurement configuration.

Note that although terminology from 3GPP LTE has been used in this disclosure to exemplify the approaches presented, this should not be seen as limiting these to only the aforementioned system. Other wireless systems, including WCDMA, WiMax, UMB and GSM, may also benefit from exploiting the ideas covered within this disclosure. The radio nodes may accordingly be adapted for operating according to one of these standards, in addition or alternatively to LTE or another standard.

Terminology such as eNodeB and UE should be considered as non-limiting and does in particular not imply a certain hierarchical relation between the two; in general "eNodeB" could be considered as radio node or device 1 and "UE" as radio node or device 2, and these two devices may communicate with each other over some radio channel and/or according to a radio or wireless standard. In the following, it is focused on wireless transmissions in the downlink, but the approaches are equally applicable in the uplink.

In wireless communications, information pertaining to reference signaling (which may be called reference measurement information) like channel state information (CSI) refers to knowledge about channel properties of a communication link. This information describes, at least partially, how a signal propagates from a transmitter to a receiver. Obtaining reference measurement information like CSI will hence enable a system to perform more efficient in transmission between the transmitter and the receiver since it will be possible to adapt to the current channel conditions. This information may be crucial for achieving reliable communication with high data rates.

In LTE Release-10, a new reference symbol sequence as example of reference signaling was introduced for the intent to estimate channel state information, the CSI-RS. The CSI-RS provides several advantages over basing the CSI feedback on the common reference symbols (CRS) which were used, for that purpose, in previous releases.

Firstly, the CSI-RS is not used for demodulation of the data signal, and thus does not require the same density (i.e., the overhead of the CSI-RS is substantially less).

Secondly, CSI-RS provides a much more flexible means to configure CSI feedback measurements (e.g., which CSI-RS resource to measure on can be configured in a UE specific manner).

Moreover, the support of antenna configurations larger than 4 antennas may resort to CSI-RS, since the CRS is only defined for at most 4 antennas.

By measuring on a CSI-RS, a referencing node like a user equipment (UE) can estimate the effective channel the CSI-RS is traversing including the radio propagation channel, antenna gains, and any possible antenna virtualizations (i.e., a CSI-RS port may be precoded so that it is virtualized over multiple physical antenna ports; that is, the CSI-RS port can be transmitted on multiple physical antenna ports, possibly with different gains and phases). In more mathematical rigor this implies that if a known CSI-RS signal x is transmitted, a UE (as an example of a referencing node) can estimate the coupling between the transmitted signal and the received signal (i.e., the effective channel). Hence if no virtualization is performed in the transmission, the received signal y can be expressed as $$y = Hx + e$$

and the UE can estimate the effective channel $H_{eff} = H$. Similarly, if the CSI-RS is virtualized using a precoder $W_{N_T \times r}$ as $$y = HW_{N_T \times r} x + e$$

the UE can estimate the effective channel $H_{eff} = HW_{N_T \times r}$.

Related to CSI-RS is the concept of zero-power CSI-RS resources (also known as a muted CSI-RS) that are configured just as regular CSI-RS resources, so that a UE knows that the data transmission is mapped around those resources. The intent of the zero-power CSI-RS resources is to enable the network to mute the transmission on the corresponding resources in order to boost the SINR of a corresponding non-zero power CSI-RS, possibly transmitted in a neighbor cell/transmission point. For Rel-11 of LTE a special zero-power CSI-RS was introduced that a UE is mandated to use for measuring interference plus noise. A UE can assume that the TPs of interest are not transmitting on the zero-power CSI-RS resource, and the received power can therefore be used as a measure of the interference plus noise.

Based on a specified CSI-RS resource and on an interference measurement configuration (e.g. a zero-power CSI-RS resource), the UE can estimate the effective channel and noise plus interference, and consequently also determine which rank, precoder and transport format to recommend that best match the particular channel, such parameters generally useful for describing channel quality information.

A referencing node like a UE may be configured for such reference signaling including reference measurement, e.g. by a configuring node and/or configuring a second node (the referencing node) for reference signaling may comprise such configuring.

Implicit CSI Feedback

For CSI feedback, LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state and/or corresponding information.

In LTE the CSI feedback is given in terms of a transmission rank indicator (RI), a precoder matrix indicator (PMI), and channel quality indicator(s) (CQI). The CQI/RI/PMI report can be wideband or frequency selective depending on which reporting mode that is configured. These parameters may be seen as comprising channel state information. It may be considered that such parameters are determined based on measurement results, e.g. by the referencing node, and/or utilizing estimation and/or calculation and/or concatenation based on results.

The RI corresponds to a recommended number of streams to be spatially multiplexed and thus transmitted in parallel over the effective channel. The PMI identifies a recommended precoder (in a codebook) for the transmission, which relates to the spatial characteristics of the effective channel. The CQI represents a recommended transport block size (i.e., code rate). There is thus a relation between a CQI and an SINR of the spatial stream(s)/beam(s) over which the transport block is transmitted.

Beamforming

Beamforming is a technique for directional signal transmission and/or reception. This is achieved by controlling the phase and/or amplitude of different signals transmitted and/or received from spatially separated antenna elements by implementing port to antenna virtualizations. The antenna elements may be separately controllable.

In order to describe different beamformers, the following notation may be used: $b_i^{(j)}(x)$ means that a signal x is beamformed by the beamformer $b_i^{(j)}$ which may represent some port to antenna (antenna element) virtualization or association.

Although the beamformer is implicitly only relevant when used together with a signal x, and then creating the signal $b_i^{(j)}(x)$, throughout this document the signal part is omitted and thus $b_i^{(j)}$ is used when it is clear from the context which signal that is being beamformed.

Furthermore, the superscript j in $b_i^{(j)}$ will indicate that this is a beamformer from the set of beamformers defined for transmission point j. It is hence possible, but not necessary, that $b_i^{(j_1)} \neq b_i^{(j_2)}$ when $j_1 \neq j_2$. The subscript i indicates the i:th beamformer from the set of beamformers defined for transmission point j. It is herein, implicitly assumed that the j:th transmission point has a limited set of available beamformers corresponding to $i = 1, 2, \ldots, I_j$, however this set may be different for different transmission points and the set may change over time depending on the state of the network.

An example of a port to antenna virtualization $b_i^{(j)}(x)$, is for instance $b_i^{(j)}(x) = B_i^{(j)} x$ where $B_i^{(j)}$ is a matrix with n rows and r columns and x is a vector with r rows. Hence, n would constitute the number of antennas/antenna elements and r would be the rank of the transmission.

One example of beamforming, in the case of downlink transmission, is illustrated in FIG. 1. As exemplified in the figure, the eNodeB corresponding to transmission point j, is able to perform beam selection between three different beams, corresponding to i=1, 2, 3. Furthermore, the eNodeB is currently transmitting using the beam $b_2^{(j)}$ which has the advantage that the transmitted energy is directed in the same direction as the propagation path between the eNodeB and the illustrated UE. Consequently the UE receives a stronger signal from the eNodeB than if beamformers $b_1^{(j)}$ or $b_3^{(j)}$ would have been used.

It should be emphasized that in a more general setting there can be any number of selection beams. In fact, the transmission beams can even be created dynamically subframe by subframe based on time-varying side information, e.g., by pointing in an arbitrary elevation direction and with an arbitrary shape (e.g., beamwidth), effectively implying an infinite number of possible beams.

It should also be noted that although the example above illustrated different beams in the elevation domain, other examples of beamforming include beamforming in the azimuth domain as well as beamforming in both azimuth and elevation domain. It is furthermore possible to also perform beamforming in the polarization domain.

Network Beamforming State Configuration

Figure 2:
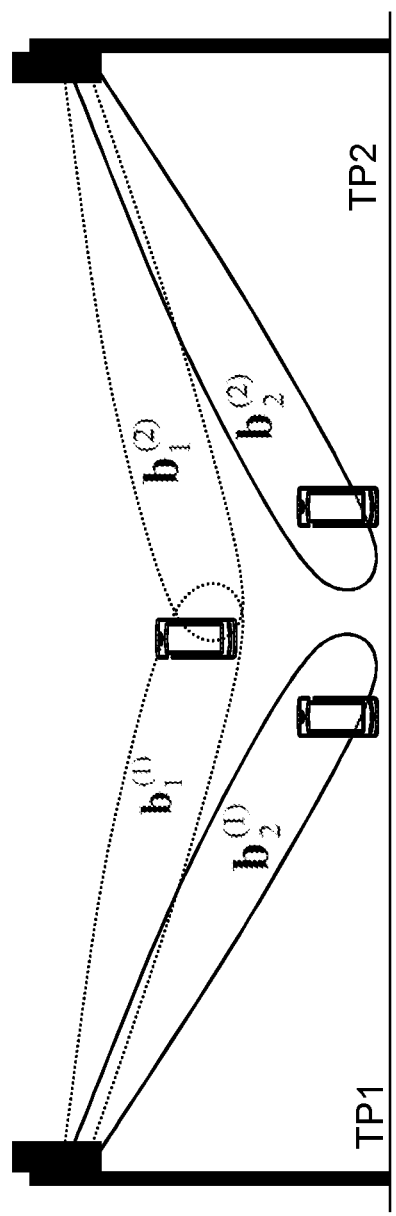
FIG. 2 shows an illustration of the need to coordinate beamformers at a network level.
Figure 3:
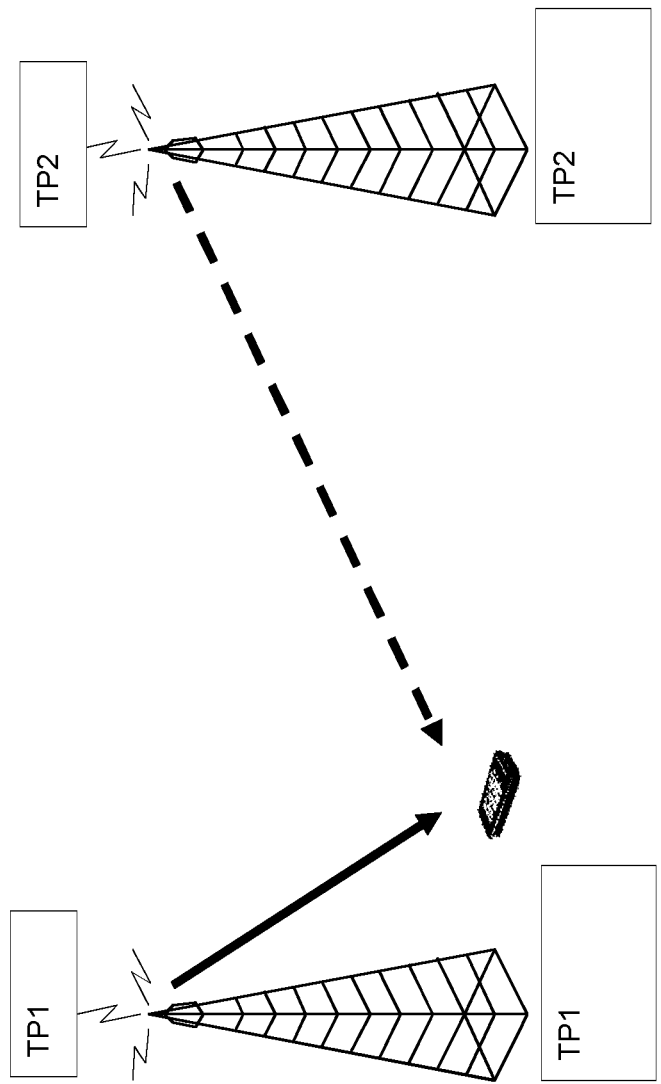
FIG. 3 shows two transmission points generating two interference hypotheses from the perspective of the illustrated UE.

In a communication network there are typically more than one eNodeB, which may operate as a transmitting node. In the case that one, or more than one, eNodeB has the ability to perform beamforming there may be a need to somehow coordinate the used beamformers at a network level. An example of this is illustrated in FIG. 2. In the figure there are two eNodeBs present and each eNodeB has the ability to select one out of its two beamformers. This will, at a network level, produce in total four different combinations of used beamformers corresponding to $(b_1^{(1)},b_1^{(2)})$, $(b_1^{(1)},b_2^{(2)})$, $(b_2^{(1)},b_1^{(2)})$ and $(b_2^{(1)},b_2^{(2)})$. One such combination of used beamformers may represent a beamforming state, in particular a 'network beamforming state'. Even if one of the eNodeBs would be fixed to transmit constantly without changing the direction of its beam, it still could be seen as being adapted for a plurality of beamforming states, due the different possible states of the other eNodeB.

For instance the network beamforming state $(b_2^{(1)},b_2^{(2)})$ is illustrated by the solid beams in the figure. The number of possible network beamforming states increase exponentially with the number of possible beamformers per point and/or the number of transmission points.

With relevant side information it might however be possible to prune the list of possible network beamforming states to include a subset of sufficiently good states. For example, from the figure we see that there is one combination, $(b_1^{(1)},b_1^{(2)})$, which might correspond to a non-desired network beamforming state. The reason is that this combination of beamformers will create a situation where there will be a high interference level for the upper UE in the figure. This may hence lead to that this upper UE receives a strong signal from its serving eNodeB but it will also receive a strong signal from the other (interfering) eNodeB which will be harmful for the link performance for this particular UE.

The term 'network beamforming state' not necessarily implies that all existing transmission points in the network are included. For instance could the two transmission points from FIG. 2 only constitute a subset of the transmission points in the entire network. However, there may exist some form of coordination between these two points which would make it relevant to analyze the created network beamforming states created by these two transmission points.

Switching Between Network Beamforming States

It may be possible for a system to change or switch between different beamforming states, in particular network beamforming states. Switching can be carried out in different ways. Some examples of this include:

The switching is carried out according to a predetermined pattern. The system may for instance have a list where a certain network beamforming state shall be used for a certain set of TFRE:s, and another network beamforming state shall be used for another set of TFRE:s and so on. This pattern may or may not be updated over time.

The network (e.g., a transmitting node and/or a coordinating node) contains some functionality that based on obtained system information will be able to optimize/decide which network beamforming state the network shall use, and hence possibly switch to, for a certain set of TFRE:s.

Considering a system with a reasonably small set of possible network beamforming states, it might be difficult to find the network beamforming state that always steers the mainlobes to all UEs of interest at any point in time. This is however not necessarily the main objective; switching between network beamforming states should be seen as a solution for increasing the spatial diversity in the network by allowing UEs to receive signals with different spatial characteristics. In essence, without switching of network beamforming states a UE might get stuck in between side lobes of the fixed beam (given by the port to antenna virtualization), but with switching the risk that a UE always falls into a nullspace reduces significantly. Switching or changing between beamforming states may also be performed at one transmission point or individual radio node or beamformer, e.g. by switching between two beams at a given antenna arrangement. From such "localized" switching a switch or change of network beamforming state follows.

Coordinated Multipoint Transmission (CoMP)

CoMP transmission and reception refers to a system where the transmission and/or reception at multiple, geographically separated antenna sites is coordinated in order to improve system performance. More specifically, CoMP refers to coordination of antenna arrays that have different geographical coverage areas.

In the subsequent discussion it is referred to an antenna covering a certain geographical area as a point, or more specifically as a Transmission Point (TP). The coordination can either be distributed, by means of direct communication between the different sites, or centralized, by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by better prediction of the interference.

CoMP Feedback

A common denominator for the CoMP transmission schemes is that the network needs CSI information not only for the serving TP, but also for the channels linking the neighboring TPs to a terminal. By, for example, configuring a unique CSI-RS resource per TP, a UE can resolve the effective channels for each TP by measurements on the corresponding CSI-RS. A CSI-RS resource can loosely be described as the pattern of resource elements on which a particular CSI-RS configuration is transmitted. A CSI-RS resource may be determined by a combination of "resourceConfig", "subframeConfig", and "antennaPortsCount", which are configured by RRC signaling. Note that the UE is likely unaware of the physical presence of a particular TP, it is only configured to measure on a particular CSI-RS resource, without knowing of any association between the CSI-RS resource and a TP.

CoMP feedback for LTE release 11 builds upon per CSI-RS resource feedback which corresponds to separate reporting of channel state information (CSI) for each of a set of CSI-RS resources. Such a CSI report could for example correspond to a Precoder Matrix Indicator (PMI), Rank Indicator (RI), and/or Channel Quality Indicator (CQI), which represent a recommended configuration for a hypothetical downlink transmission over the same antennas used for the associated CSI-RS (or as the RS used for the channel measurement). More generally, the recommended transmission should be mapped to physical antennas in the same way as the reference symbols used for the CSI channel measurement.

Potentially there could be interdependencies between the CSI reports; for example, they could be constrained to have the same RI.

Interference Measurements for CoMP

For efficient CoMP operation it is equally important to capture appropriate interference assumptions when determining the CQIs as it is to capture the appropriate received desired signal. In uncoordinated systems the UE can effectively measure the interference observed from all other TPs (or all other cells), which will be the relevant interference level in an upcoming data transmission. Such interference measurements are typically performed by analyzing the residual interference on CRS resources (after the UE subtracts the impact of the CRS signal).

In coordinated systems performing CoMP such interference measurements becomes increasingly irrelevant. Most notably, within a coordination cluster an eNodeB can to a large extent control which TPs that interferes a UE in any particular time/frequency resource element (TFRE). Hence, there will be multiple interference hypotheses, not necessarily corresponding to the present interference level, depending on which TPs are transmitting data to other terminals.

For the purpose of improved interference measurements new functionality was introduced in LTE Release 11, where the agreement is that the network will be able to configure a UE to measure interference on a particular Interference Measurement Resource (IMR) that identifies a particular set of TFREs that is to be used for a corresponding interference measurement. The network can thus control the interference seen on an IMR, by for example muting all TPs within a coordination cluster on the IMR, in which case the UE will effectively measure the inter CoMP-cluster interference.

Figure 7:
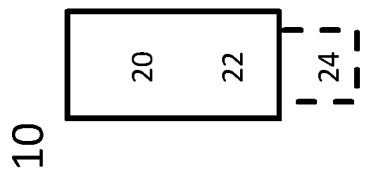
FIG. 7 shows an example of a user equipment as an example of a referencing node.

Take for example the system illustrated in FIG. 7 where transmission points TP1 and TP2 form a coordination cluster. From the perspective of the illustrated UE, served by TP1, there will exist two relevant interference hypotheses: In one interference hypothesis the UE sees no interference from the coordinated neighboring transmission point TP2 since it is muted and hence the UE will only experience the signal from its serving point, TP1. In the second hypothesis the UE sees interference from the neighboring point, TP2, as well as the desired signal from its serving point TP1.

To enable the network to effectively determine whether or not a TP should be muted in this example, the UE can measure two (or generally multiple) IMRs corresponding to the different interference hypotheses. One way to generate these IMRs is shown in Table 1. The first IMR corresponds to the first mentioned hypothesis mentioned above, i.e. no interference from TP2 with the implicit assumption that the desired signal originates from the TP1. The second IMR corresponds to the second hypothesis.

FIG. 7 shows two transmission points generating two interference hypotheses from the perspective of the illustrated UE.

TABLE 1

IMR configuration for the example in FIG. 7. 1 represents that the TP is transmitting, 0 represents that the TP is muted.

| IMR | TP1 | TP2 |
|-----|-----|-----|
| 1   | 0   | 0   |
| 2   | 0   | 1   |

A transmitting node may be adapted for CoMP. Transmitting reference signaling may comprise transmitting in CoMP.

CSI Process

In LTE Release 11, CSI processes are defined such that each CSI process is associated with a CSI-RS resource and a CSI-IM resource. A UE in transmission mode can be configured with one or more CSI processes per serving cell by higher layers and each CSI reported by the UE corresponds to a CSI process. A UE may be configured with a RI-reference CSI process for any CSI process, such that the reported RI for the CSI process is the same as for the RI-reference CSI process. This configuration may be used to force a UE to report the same RI for several different interference hypotheses, even though another RI would be the best choice for some hypotheses. Furthermore, a UE is restricted to report PMI and RI within a precoder codebook subset configured for each CSI process by higher layer signaling. This configuration may also be used to force a UE to report a specific rank for a certain CSI process.

An important part of getting a system to operate at a good performance level may comprise implementing an efficient link adaptation, e.g. by using modulating and/or encoding based on channel conditions and/or channel quality information or another form of information pertaining to reference signaling. In a system employing dynamic beamforming, the beamformed radiated signals may result in spatially changing interference in neighboring cells which in turn may dramatically reduce the effectiveness of the link adaptation. In a system where a UE is unaware of the changing interfering beamformers it will generate its CSI based on the interference from given a historical network beamforming state which may correspond poorly to the upcoming network beamforming state. This may lead to inaccurate CSI which in turn may lead to an inefficient transmission.

An alternative is to use beamforming aware coordinated link adaptation where the eNodeBs in the network knows spatial CSI regarding every relevant channel between a TP and a UE in the coordination area, as well as the coming transmission state of all other eNodeBs in the coordination area. Based on the CSI and the transmission states the eNodeBs are able to figure out the correct link adaptation taking all available information into account. The problem with this solution is that it requires a lot of CSI, which is not that easy to acquire, as well as very tight coordination between eNodeBs.

An approach described herein is based on beamforming reference signaling like CSI-RSs, in particular transmitting the beamformed signals e.g. on TFRE resources covered by a set of IMRs, and configure a set of IMRs, CSI-RSs and a set of corresponding CSI processes in such a way that each CSI process, within this set, corresponds to a distinct network beamforming state. The reported CSI from each of these CSI processes will then contain relevant CSI information given that the network transmits according to the corresponding network beamforming state.

The network, e.g. a coordinating node, may then be able to make a scheduling decision, at least partly based on the obtained CSI information from the set of CSI processes, and the schedule transmissions according to one out of the set of network beamforming states, while still maintaining good link adaptation.

There may be considered a coordinating node adapted for, and/or comprising a scheduling module for, scheduling based on received information based on received reference signaling. The coordinating node and/or the scheduling module may be adapted for obtaining and/or receiving such information from a plurality of referencing nodes. A method for operating a coordinating node may be considered, the method comprising scheduling based on received information based on received reference signaling. Scheduling may comprise resource (time-frequency resource) scheduling for one or more transmitting nodes and/or referencing nodes and/or determining and/or configuring link adaptation for one or more transmitting and/or referencing nodes. Scheduling may comprise transmitting and/or configuring the node/s with corresponding configuration data. Link adaptation may generally comprise configuring and/or setting a modulation and/or encoding for transmission.

In the following a number of embodiments will be presented. According to the suggested approaches, one or more CSI-processes may be configured such that for each UE, a set of CSI processes corresponds to a set of (network) beamforming states. In each TTI (Transmission Time Interval), downlink transmissions in the network may correspond to and/or be performed in one of the network beamforming states. Under this condition, the CSI used for link adaptation will match the state of the beamformers in the network when transmitting.

Consider an example similar to the example in FIG. 7 but with M transmission points. A set of CSI processes (reference measurement configurations) for a UE served by TP1 in order to obtain the desired feedback for a set of network beamforming states n=1, . . . , N. The CSI-RS can be configured according to
Table 2 which illustrates that TP1 transmits one CSI-RS, on a set of TFREs, to the UE of interest using beamformer $b_{i_1(n)}^{(1)}$ associated with TP1 for network beamforming state n. Based on this CSI-RS the UE will then be able to estimate the effective beamformed channel between TP1 and the UE of interest for network beamforming state n.

Furthermore, the CSI-RS corresponding to transmission with beamformer $b_{i_1(n)}^{(1)}$ may be considered to be the q(n):th CSI-RS where q(n) is a function mapping one integer to one other. One trivial design of q(n) is q(n)=n implying that there exists one CSI-RS for each network beamforming state. However, if $b_{i_1(n_1)}^{(1)} = b_{i_1(n_2)}^{(1)}$ the CSI-RS for network beamforming states $n_1$ and $n_2$ are identical meaning that $q(n_1)=q(n_2)$ will be possible. Hence, using this strategy the total number of needed CSI-RSs can be reduced.

TABLE 2

CSI-RS configuration for network beamforming state n.

| CSI-RS | TP1 |
|---|---|
| q(n) | $b_{i_1(n)}^{(1)}$ |

In addition to having the CSI-RS matching and/or being associated to the network beamforming states, the IMRs may be set up; for each CSI process there is an IMR associated, and on the corresponding TFREs the neighboring transmission points should transmit beamformed interfering signals that match the respective network beamforming state.

Table 3 describes the transmitted signals of each transmission point on the IMRs. Here r(n) is a function mapping one integer to another in a similar manner as q(n). Hence, if network beamforming states $n_1$ and $n_2$ are identical with respect to TP2, TP3, . . . , TPM $r(n_1)=r(n_2)$ will be a possible choice.

Furthermore, note that the transmitted signals from interfering TPs 2 through M need not contain any useful information since it only acts as interference and will not be coherently decoded by the UE of interest. Note further that TP1 is silent on the IMR TFRE so as to not impact the interference measurements.

TABLE 3

IMR configuration and corresponding beamforming on the IMR's TFRE for network beamforming state n.

| IMR | TP1 | TP2 | TP3 | . . . | TPM |
|---|---|---|---|---|---|
| r(n) | 0 | $b_{i_2(n)}^{(2)}$ | $b_{i_3(n)}^{(3)}$ | . . . | $b_{i_4(n)}^{(M)}$ |

Given the configured IMR and the configured CSI-RS, a CSI process also need to be configured as illustrated in Table 4. The resulting CSI-process represents the interference hypothesis as defined by the IMR, and desired signal beamforming defined by the CSI-RS process. Hence, the resulting feedback from this CSI process will represent the hypothesis that the serving TP1 is beamforming its signal with beamformer $b_{i_1(n)}^{(1)}$ whereas the interference consists of the beamformed signals from TP2 through TPM, using $b_{i_2(n)}^{(2)}$, $b_{i_3(n)}^{(3)}$, . . . , $b_{i_4(n)}^{(M)}$ respectively. Hence, the CSI process n is configured in such a manner that its CSI will correspond to network beamforming state n.

TABLE 4

CRI processes configuration.

| CSI process | CSI-RS | IMR |
|---|---|---|
| N | q(n) | r(n) |

It should here be pointed out that the approach is applicable also when $b_{i_1(1)}^{(1)} = b_{i_1(n)}^{(1)}$ for all n. Hence, this is the case when TP1 only is using one beamformer. For this case, given that at least one of TP2, TP3, . . . , TPM uses multiple beamformers, there will exist multiple network beamforming states and hence multiple CSI-processes created by one CSI-RS and multiple IMRs. In the same manner the invention is applicable also when TP2, TP3, . . . , TPM uses one beamformer each whereas TP1 uses multiple beamformers.

For this case there will exist multiple CSI-processes created by multiple CSI-RS and one IMR.

Improved Link Adaptation in Elevation Beamforming

Now it is returned to the example illustrated in FIG. 2, which deals with beamforming in the elevation domain. As previously mentioned, $(b_1^{(1)}, b_1^{(2)})$, may correspond to a non-desired network beamforming state. A remedy to this would be to only allow the network to use the network beamforming states $(b_1^{(1)}, b_2^{(2)})$, $(b_2^{(1)}, b_1^{(2)})$ and $(b_2^{(1)}, b_2^{(2)})$. Hence, the non-desired state $(b_1^{(1)}, b_1^{(2)})$ is excluded from the list of allowed combinations. In the following, a set of CSI processes (reference measurement configurations) corresponding to these three network beamforming states will be set (associated to the beamforming states).

When switching from one state to another, the system may experience problems with its link adaptation since the CSI is created from one network beamforming state but transmission will occur with another network beamforming state. In the presented approach, this problem may be addressed by configuring a set of CSI-processes as shown in Table 5-Table 7. For simplicity, only the CSI-processes corresponding to transmission point 1 are illustrated, but the CSI-processes should be configured in a similar manner also for transmission point 2, e.g., where TP2 is silent on IMRs where TP1 is transmitting beamformed interference, and where the CSI-RSs for TP2 reflects the two beamforming states.

TABLE 5

Defined IMRs.

| IMR | TP1 | TP2 |
|---|---|---|
| 1 | 0 | $b_1^{(2)}$ |
| 2 | 0 | $b_2^{(2)}$ |

TABLE 6

CSI_RS defined for transmission point 1.

| CSI-RS | TP1 |
|---|---|
| 1 | $b_1^{(1)}$ |
| 2 | $b_2^{(1)}$ |

TABLE 7

CRI processes defined for transmission point 1.

| CSI process | CSI-RS | IMR |
|---|---|---|
| 1 | 1 | 2 |
| 2 | 2 | 1 |
| 3 | 2 | 2 |

As can be seen, the CSI-processes defined above will effectively correspond to the different possible network beamforming states. CSI-process number 1 will for instance correspond to the network beamforming state $(b_1^{(1)}, b_2^{(2)})$, CSI-process 2 will correspond to $(b_2^{(1)}, b_1^{(2)})$ etc. Hence, given that it is operated with one given network beamforming state, there still may be relevant CSI feedback for the other possible network beamforming states. This will therefore enable an efficient transition between different states since the system will be able to perform efficient link adaptation, also when the network beamforming state is changed.

Finally, it is pointed out the connection to the previously defined functions q(n) and r(n). In this embodiment q(1)=1, q(2)=2 and q(3)=2 and furthermore r(1)=2, r(2)=1 and r(3)=2 as can be seen from Table 7.

Adding More eNodeBs

Figure 4:
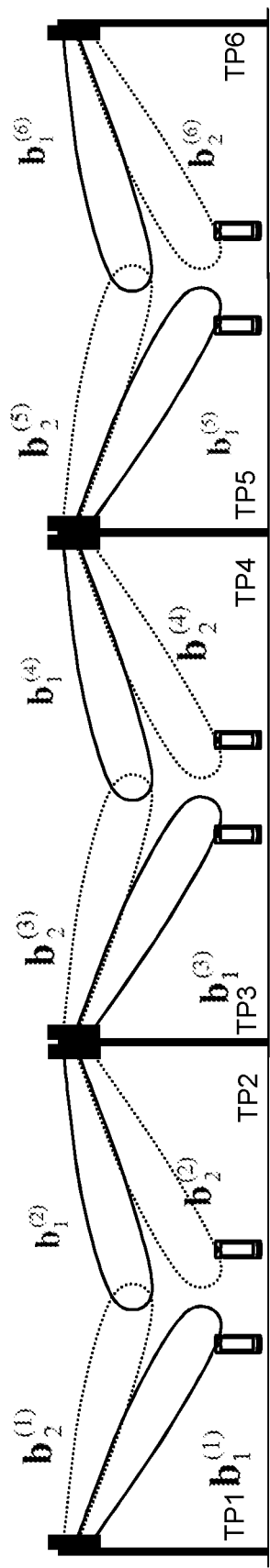
FIG. 4 shows an illustration of six transmission points.

Although the previous embodiment discussed the case of two eNodeBs the approaches are not limited to any certain numbers of eNodeBs, they can be followed for one eNodeB (transmitting node) or a number larger than 2. In FIG. 4, a network consisting of a larger number of eNodeBs is illustrated. The system may be constrained to use only two network beamforming states: $(b_1^{(1)}, b_1^{(2)}, b_1^{(3)}, b_1^{(4)}, b_1^{(5)}, b_1^{(6)})$ and $(b_2^{(1)}, b_2^{(2)}, b_2^{(3)}, b_2^{(4)}, b_2^{(5)}, b_2^{(6)})$. The first of these two states is illustrated in the figure using solid lines. FIG. 4 generally shows an Illustration of six transmission points.

In Table 8-Table 12 it is illustrated how the presented approach may address this situation in order to obtain efficient CSI by defining a set of CSI-processes where each CSI-process corresponds to one of the existing network beamforming states. Only the CSI-processes corresponding to transmission point 1 and transmission point 6 are illustrated but it will be obvious for a person skilled in the art how to configure the CSI-processes in a similar manner also for the other transmission points.

TABLE 8

Defined IMRs.

| IMR | TP1 | TP2 | TP3 | TP4 | TP5 | TP6 |
|---|---|---|---|---|---|---|
| 1 | 0 | $b_1^{(2)}$ | $b_1^{(3)}$ | $b_1^{(4)}$ | $b_1^{(5)}$ | 0 |
| 2 | 0 | $b_2^{(2)}$ | $b_2^{(3)}$ | $b_2^{(4)}$ | $b_2^{(5)}$ | 0 |

TABLE 9

CSI-RS defined for transmission point 1.

| CSI-RS | TP1 |
|---|---|
| 1 | $b_1^{(1)}$ |
| 2 | $b_2^{(1)}$ |

TABLE 10

CSI processes defined for transmission point 1.

| CSI process | CSI-RS | IMR |
|---|---|---|
| 1 | 1 | 1 |
| 2 | 2 | 2 |

TABLE 11

CSI-RS defined for transmission point 6.

| CSI-RS | TP6 |
|---|---|
| 3 | $b_1^{(6)}$ |
| 4 | $b_2^{(6)}$ |

TABLE 12

CRI processes defined for transmission point 6.

| CSI process | CSI-RS | IMR |
|---|---|---|
| 3 | 3 | 1 |
| 4 | 4 | 2 |

It should be noted that both the CSI-processes for transmission point 1 and 6 in this example are using the same IMRs. This is possible since these IMRs have been configured with a reuse strategy; it is assumed that UEs served by TP6 will not be heavily affected by the interference produce by TP1 and vice versa. Therefore, this interference is in some sense neglected by letting both TP1 and TP6 be quiet in IMRs 1 and 2. Hence, in the defined CSI-processes 1-4, where IMR 1-2 are used, this interference will effectively be neglected. The advantage with this reuse strategy is that such a configuration will scale better when the number of eNodeBs grows large. In one embodiment, with a very large number of eNodeBs and two possible network beamforming states, we use such a reuse strategy such that transmission points 1, 6, 11, 16, . . . utilize IMRs 1-2
transmission points 2, 7, 12, 17, . . . utilize IMRs 3-4
transmission points 3, 8, 13, 18, . . . utilize IMRs 5-6
transmission points 4, 9, 14, 19, . . . utilize IMRs 7-8
transmission points 5, 10, 15, 20, . . . utilize IMRs 9-10 in a similar manner as the previous embodiment. Hence, in such a manner it is possible to produce relevant IMRs, and hence CSI-processes, for an entire network only using 10 IMRs. Hence, by utilizing this kind of reuse strategy we can lower the number of needed IMRs in a large network.

Improved Link Adaptation in Azimuth Beamforming

Figure 5:
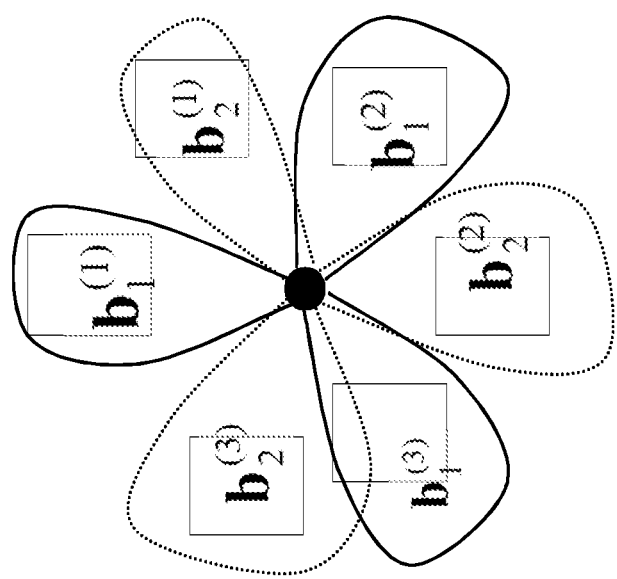
FIG. 5 shows an illustration of a three sector site from above.

Although the previous example considered beamforming in the elevation domain the presented invention is not limited to the elevation domain. Below an embodiment is presented where the invention is utilized in the azimuth domain. In FIG. 5 it is assumed that a site is seen from above. At the site there are three sectors present and each sector can operate using one out of two beamformers or beams (one possible way to implement this is to use a six sector site where only three sectors are active at the time). It is assumed that there exist two network beamforming states; $(b_1^{(1)}, b_1^{(2)}, b_1^{(3)})$ and $(b_2^{(1)}, b_2^{(2)}, b_2^{(3)})$.

The approaches presented may then be applied by configuring a set of CSI-processes as illustrated in Table 13-Table 15.

TABLE 13

Defined IMRs.

| IMR | TP1 | TP2 | TP3 |
|---|---|---|---|
| 1 | 0 | $b_1^{(2)}$ | $b_1^{(3)}$ |
| 2 | 0 | $b_2^{(2)}$ | $b_2^{(3)}$ |

TABLE 13

CSI_RS defined for transmission point 1.

| CSI-RS | TP1 |
|---|---|
| 1 | $b_1^{(1)}$ |
| 2 | $b_2^{(1)}$ |

TABLE 14

CSI_RS defined for transmission point 1.

| CSI process | CSI-RS | IMR |
|---|---|---|
| 1 | 1 | 1 |
| 2 | 2 | 2 |

Using Different Beamformer Shapes

Figure 6:
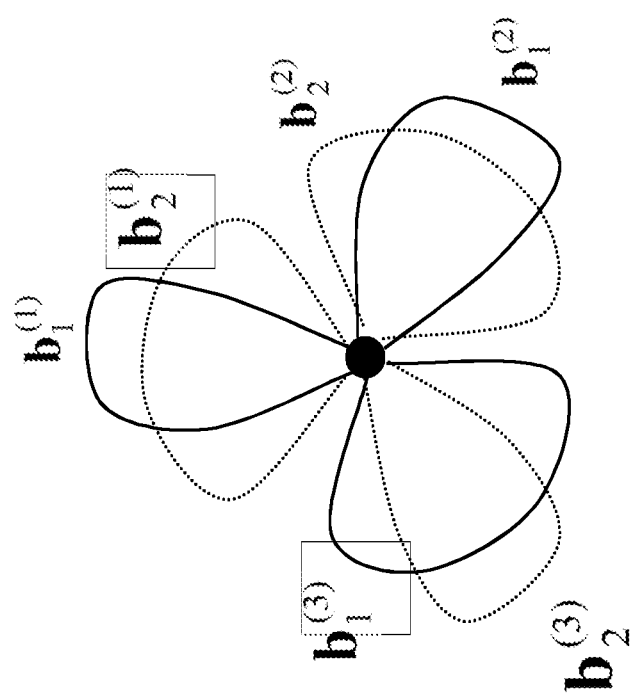
FIG. 6 shows an illustration of a six sector site from above.

In previous embodiments, the approaches mainly have been applied to situations where an eNodeB is able to beamform in different directions. It should be emphasized that they are equally applicable also in the more general setting where the eNodeB is able to select between different beamformers and/or beams (representing different beamforming states). An embodiment of this is illustrated below in FIG. 6, which shows an illustration of a six sector site from above.

The CSI-processes may for this situation be configured in the same manner as in the previous embodiment.

Coordinated Beamforming State Selection $b_1^{(1)}$

In this embodiment the selection of beamforming states, e.g. in the down link transmission, is done dynamically, optimized according to an objective, such as maximum sum rate or proportional fair metric, taking CSI into account. For instance, a coordinating node in the network that has collected at least parts of the beamforming state CSI reports from the UEs (information pertaining to received reference signaling), may determine for certain time intervals, e.g. on a per TTI basis, what the next beamforming state that the transmission points in the coordinating area should use for data transmission. A coordinating node may comprise a corresponding determining module and/or be adapted for such determining.

Dynamic Update of Beamforming States

This embodiment describes how the network can update, add or remove network beamforming states in order to make the set of network beamforming states as relevant as possible at any point in time.

By analyzing the reported CSI for the different network beamforming states, the network (e.g., a transmitting node, configuring node and/or coordinating node) can detect that certain network beamforming states are less useful.

The network can then remove the network beamforming state, by reconfiguring the UEs to stop measuring on the corresponding IMRs and CSI-RS, and to start using the TFRE resources for regular data transmission. This may be seen as scheduling and/or configuring one or more nodes, in particular nodes with added or removed (individual) beamforming states (it should be seen that to change the network beamforming state, the possible beamforming states and/or multiple beamforming states the node, e.g. transmitting node, is adapted for, may be changed. Generally, a coordinating node (and/or a node itself) may be adapted to adapted and/or configure the plurality of beamforming states a node is adapted for. A method for operating any of the nodes herein, in particular a method for operating a configuring node and/or transmitting node may comprise configuring the plurality of beamforming states a node is adapted for, e.g. via a state adaption module.

Another option is to preserve the configuration in the UEs but changing the beam patterns or shapes for the network beamforming state on the network side. The network may then wait for a preconfigured time before using the updated network beamforming state in downlink transmissions to ensure that the transient in reported CSI has faded.

Finally, the network can dynamically add new network beamforming states by configuring new CSI processes in the UEs, allocating new IMRs and CSI-RS signaling.

Overlapping Beamforming States

Not all TPs need to have distinct transmission beams in different network beamforming states.

Some TPs can for instance have identical beamformers for two different network beamforming states. Another example is the case where some TPs in the coordination area may not even be capable of beamforming over spatially correlated antennas, e.g., a 2TX (TX=Transmitter) cross polarized antenna.

Approaches presented herein will enable configuration of a set of IMRs, CSI-RSs and CSI processes in such a way that each CSI process, within this set, corresponds to a beamforming state, which may be a network beamforming state. Based on this, the CSI processes jointly may contain relevant CSI information for a set of possible network beamforming states. This will in turn enable efficient link adaptation when switching from one network beamforming state to another network beamforming states within this set.

There may be generally considered:

A. A method where an eNodeB
- configures a set of at least one CSI-RS, and
- configures a set of at least one IMR, and
- configures a set of multiple CSI-processes based on said set of CSI-RS and said set of IMR in such a way that each CSI-process, within this set, corresponds to a beamforming state, e.g. a network beamforming state.

B. A method according to A where there is at least one CSI-RS in said set of CSI-RSs and more than one IMR in said set of IMRs.

C. A method according to A or B where there is at least one IMR in said set of IMRs and more than one CSI-RS in said set of CSI-RSs.

D. A method according to one of A to C, where the eNodeB schedules a UE based on, at least partly, information obtained from said CSI-processes and performs data transmission to said UE.

E. A method according to one of A to D, where the network, e.g. a coordinating node, in at least one TTI, takes a decision on which network beamforming state that should be used for data transmission based on, at least in partial, information from the said CSI-processes.

There may be considered a transmitting node and/or eNodeB adapted to perform any of the actions of A to E.

FIG. 7 schematically shows radio node 10, which may be a user equipment as an example of a referencing node. Radio node or user equipment 10 comprises control circuitry 20, which may comprise a controller connected to a memory. Any module of a referencing node or user equipment may be implemented in and/or executable by, radio node or user equipment 10, in particular the control circuitry 20. Radio node or user equipment 10 also comprises radio circuitry 22 providing receiving and transmitting or transceiving functionality, the radio circuitry 22 connected or connectable to the control circuitry. An antenna circuitry 24 of the radio node or user equipment 10 is connected or connectable to the radio circuitry 22 to collect or send and/or amplify signals. Radio circuitry 22 and the control circuitry 20 controlling it are configured for cellular communication, in particular utilizing E-UTRAN/LTE resources as described herein. The radio node or user equipment 10 may be adapted to carry out any of the methods for operating a radio node, in particular a radio node like a referencing node, disclosed herein; in particular, it may comprise corresponding circuitry, e.g. control circuitry. The radio node or user equipment 10 may be adapted to receive referencing signaling and to perform measurements according to a reference measurement configuration on this signaling. The radio node or user equipment may be adapted to transmit a corresponding report to a network or radio node, e.g. a transmitting node and/or coordinating node.

Figure 8:
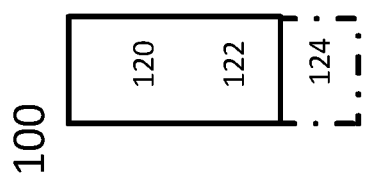
FIG. 8 shows an example of a base station as an example of a transmitting node.

FIG. 8 schematically show a radio node or base station 100 as an example of a radio node like a transmitting node or configuring node. Radio node or base station 100 in particular may be an eNodeB. Radio node or base station 100 comprises control circuitry 120, which may comprise a controller connected to a memory. Any module of a radio node, in particular a transmitting node or configuring node, e.g. a transmitting module and/or determining module and/or scheduling module, may be implemented in and/or executable by the radio node, in particular the control circuitry 120. The control circuitry 120 is connected to control radio circuitry 122 of the radio node 100, which provides receiver and transmitter and/or transceiver functionality. An antenna circuitry 124 may be connected or connectable to radio circuitry 122 for signal reception or transmittance and/or amplification. The radio node 100 may be adapted to carry out any of the methods for operating a radio node, in particular a radio node like a transmitting node and/or configuring node. The radio node may comprise corresponding adapted (e.g. programmed) circuitry, e.g. control circuitry.

Figure 9C:
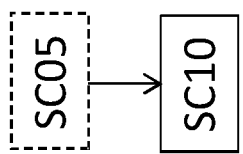
FIGS. 9a, b, c show exemplary flowcharts of methods for operating a transmitting node, a referencing node and a configuring node, respectively.
Figure 9B:
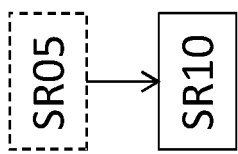
Figure 9A:
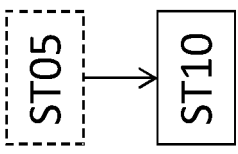

FIG. 9a shows an example of a method for operating a transmitting node. The method may comprise an optional action ST05 of configuring a referencing node or second node. In action ST10, transmitting reference signaling based on a beamforming state of the transmitting node may be performed.

FIG. 9b shows an example of a method for operating a referencing node. The method may comprise an optional action SR05 of configuring the referencing node, e.g. based on configuration data received from a network, in particular a configuring and/or transmitting node. The configuring may be performed by the referencing node. The configuration data may pertain to a beamforming state (in particular, a beamforming state in which reference signaling is being transmitted) and/or a reference measurement configuration and/or a plurality of beamforming states of the transmitting node (e.g., identifying the possible beamforming states). In an action SR10, the referencing node may transmit information pertaining to received reference signaling based on a beamforming state indication. The beamforming state indication may be received from the network, in particular the transmitting node and/or a configuring node, e.g. in action SR05.

FIG. 9c shows an example of a method for operating a configuring node. An optional action SC05 may comprise determining a configuration for a second node, e.g. a referencing node, for example a reference measurement configuration. Alternatively, determining may comprise determining a configuration of a plurality of beamforming states for a node, e.g. a transmitting node, and/or a beamforming state to be used for transmitting reference signaling by a transmitting node. The determining may be performed based on a beamforming state of a transmitting node, in particular on a state associated to the reference measurement configuration. An action S10 may comprise configuring the second node for reference signaling based on the beamforming state of a transmitting node. The configuring may in particular be considered to be based on the beamforming state if determining was performed based on the beamforming state.

Figure 10C:
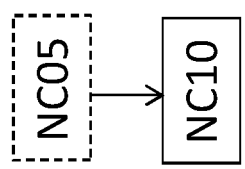
FIGS. 10a, b, c show examples of a transmitting node, a referencing node and a configuring node, respectively.
Figure 10B:
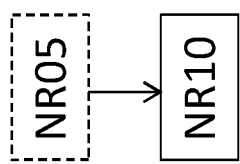
Figure 10A:
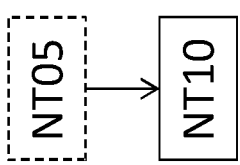

FIG. 10a shows an example of a transmitting node. The transmitting node may comprise an optional configuring module NT05 for performing action ST05. The transmitting node may comprise a transmitting module NT10 for performing action ST10.

FIG. 10b shows an example of a referencing node. The referencing node may comprise an optional configuring module NR05 for performing action SR05. The referencing node may comprise an information transmitting or response module NR10 for performing action SR10.

FIG. 10c shows an example of a configuring node. The configuring node may comprise an optional determining module NC05 for performing action SC05. The configuring node may comprise a configuring module NC10 for performing action SC10.

In the context of this specification, an antenna arrangement may comprise a plurality and/or two or more antenna elements, in particular a multitude of two antenna elements, e.g. 4 or 8 antenna elements. The antenna elements of an antenna arrangement may be spatially separated. Generally, an antenna element of an antenna arrangement may be controllable and/or usable for transmission independently (of each antenna elements of the antenna arrangement). In particular, the antenna elements of an antenna arrangement may be independently controllable and/or usable individually and/or in at least two groups. For example, two or more antenna elements may be grouped together in an element group and/or be controllable and/or usable for transmission utilizing a common port associated to an element group. It may generally be considered that antenna elements controllable for collective beamforming form an antenna arrangement.

A radio node may generally comprise and/or be represented by any node adapted for radio and/or wireless communication. In particular, a radio node may be a network node or a terminal, the latter of which may also be referred to as user equipment. A radio node may generally be adapted for operation (e.g., transmitting and/or receiving) according to at least one wireless communication standard, e.g. LTE.

It may be considered that a radio node comprises control circuitry and/or radio circuitry and/or comprises and/or is connected or connectable to antenna circuitry, e.g. on or more antenna arrangements. Control circuitry may comprise one or more controllers or processors and/or a processor arrangement and/or controller arrangement, which may comprise, e.g. one or more microcontrollers and/or microprocessors and/or ASIC (Application-Specific Integrated Circuit) and/or FPGA (Field-Programmable Gate Array) and/or other suitable integrated circuitry. It may be considered that control circuitry comprises and/or is connected or connectable to one or more storage media and/or memories, which may be accessible, e.g. for reading and/or writing, e.g. by the one or more controllers or processors. Radio circuitry may comprise any device or circuitry adapted for transmitting and/or receiving wireless or radio signaling or signals, e.g. transceiver circuitry and/or transmitter circuitry and/or receiver circuitry and/or amplifier circuitry and/or tuning circuitry, etc. Radio circuitry may be connected or connectable to control circuitry, which may be adapted to control the radio circuitry. Antenna circuitry may comprise one or more antenna arrangements. It may be considered that antenna circuitry is connected or connectable to radio circuitry and/or control circuitry. Control circuitry and/or radio circuitry may be adapted to control antenna circuitry. It may be considered that antenna circuitry is adapted to transmit and/or receive signaling or signals, which may be provided from and/or to the radio circuitry. Antenna circuitry or parts thereof may be implemented as and/or seen as radio circuitry or vice versa, either physically or logically. For example, antenna circuitry may comprise preamplifier circuitry, etc.

Generally, a reference measurement configuration, with or for which a referencing node may be configured or configurable, may pertain to specific or associated reference signaling and/or a specific or associated beamforming state, in particular the beamforming state in which the reference signaling is transmitted.

Changing and/or switching a beamformer may lead to changing a beamforming state. A network beamforming state may comprise, and/or consist of, a sum and/or combination and/or tuple of beamforming states of individual nodes. The beamforming state of an individual node may reflect its own beamforming setting or configuration, but may include the beamforming configuration of other nodes, in particular such nodes which might interfere. However, the approaches described herein, although discussed in detail in the context of networks comprising multiple transmitting nodes, may easily performed with one (single) transmitting node, e.g. in the context of interferences/beam reflections appearing depending on the beamforming state of the node.

The plurality of beamforming states a node is adapted for generally may comprise the possible beamforming states of a node, e.g. those which are physically and/or technically possible and/or those allowed and/or configured, e.g. by the network. It should be considered that beamforming states may pertain to stationary and/or steady beams, e.g. end positions and/or predefined beams, which may be fixed in terms of direction and/or shape.

A wireless network, also referred to as wireless communication network, mobile network or mobile communication network or simply as "network", may be implemented as cellular network or cellular communication network. A network may comprise one or more radio nodes, each of which may be adapted for radio and/or wireless communication with one or more other radio nodes, e.g. according to a telecommunications standard like LTE. In particular, there may be defined and/or provided an air interface, e.g. according to LTE. Some of the radio nodes may be connected or connectable to higher levels of the network and/or a core network, which may be adapted for control functionality and/or transport of information and data between nodes, in particular radio nodes.

Each or any one of the radio nodes or terminals or user equipments shown in the figures may be adapted to perform the methods to be carried out by a radio node or terminal/user equipment described herein. Alternatively or additionally, each or any of the radio nodes or terminals/user equipments shown in the figures may comprise any one or any combination of the features of a terminal/user equipment described herein.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a transmitting node of a wireless communication network, the transmitting node being adapted for a plurality of beamforming states, wherein the method comprises:
    transmitting reference signaling to a referencing node, based on a beamforming state of the transmitting node, wherein the transmitting is performed based on a mapping between the plurality of beamforming states and associated reference signaling, and wherein the mapping comprises mapping of timing of the reference signaling to each of the plurality of beamforming states;
    changing between beamforming states of the plurality of beamforming states based on a predetermined pattern;
    detecting whether certain beamforming states are less useful by analyzing information pertaining to the reference signaling reported from the referencing node for different beamforming states; and
    upon detecting that the certain beamforming states are less useful, removing the beamforming state by reconfiguring the referencing node to stop measuring on corresponding interference measurement resources (IMRs) and channel state indicator-reference signal (CSI-RS) comprised of the information, and to start using the time/frequency resource element (TFRE) resources for regular data transmission.

2. The method according to claim 1, wherein the reference signaling comprises CSI-RS signaling.

3. A non-transitory computer-readable medium storing computer-executable instructions that, when executed by at least one processor, configure the transmitting node for the wireless communication network to perform operations corresponding to the method of claim 1.

4. A transmitting node for a wireless communication network, the transmitting node being adapted for a plurality of beamforming states, the transmitting node comprising:
    a transmitter;
    at least one processor operatively coupled to the transmitter; and
    at least one memory storing computer-executable instructions that, when executed by the at least one processor, adapt the transmitting node to:
        transmit reference signaling to a referencing node, based on a beamforming state of the transmitting node, wherein the transmission of the reference signaling is based on a mapping between the plurality of beamforming states and associated reference signaling, and wherein the mapping comprises mapping of timing of the reference signaling to each of the plurality of beamforming states;
        change between beamforming states of the plurality of beamforming states based on a predetermined pattern;
        detect whether certain beamforming states are less useful by analyzing information pertaining to the reference signaling reported from the referencing node for different beamforming states; and
        upon detecting that the certain beamforming states are less useful, remove the beamforming state by reconfiguring the referencing node to stop measuring on corresponding interference measurement resources (IMRs) and channel state indicator-reference signal (CSI-RS) comprised of the information pertaining to received reference signaling, and to start using time/frequency resource element (TFRE) resources for regular data transmission.

5. The transmitting node according to claim 4, wherein the reference signaling comprises CSI-RS signaling.

6. A method for operating a referencing node of a wireless communication network, the method comprising:
    transmitting information pertaining to received reference signaling to a transmitting node, based on an indication of a beamforming state, wherein the referencing node is adapted for a plurality of beamforming states, and wherein the indication of the beamforming state is based on a configuration of the referencing node; and
    changing between beamforming states of the plurality of beamforming states based on a predetermined pattern, wherein the referencing node is reconfigured to stop measuring on corresponding interference measurement resources (IMRs) and channel state indicator-reference signal (CSI-RS) comprised of the information pertaining to received reference signaling, and to start using time/frequency resource element (TI-RE) resources for regular data transmission for removing the beamforming state upon detecting whether certain beamforming states are less useful.

7. A non-transitory computer-readable medium storing computer-executable instructions that, when executed by at least one processor, configure the referencing node for the wireless communication network to perform operations corresponding to the method of claim 6.

8. A referencing node for a wireless communication network, the referencing node comprising:
    a transmitter;
    at least one processor operatively coupled to the transmitter; and
    at least one memory storing computer-executable instructions that, when executed by the at least one processor, adapt the referencing node to:

transmit information pertaining to received reference signaling to a transmitting node, based on an indication of a beamforming state, wherein the referencing node is adapted for a plurality of beamforming states, and wherein the indication of the beamforming state is based on a configuration of the referencing node; and change between beamforming states of the plurality of beamforming states based on a predetermined pattern, wherein the referencing node is reconfigured to stop measuring on corresponding interference measurement resources (IMRs) and channel state indicator-reference signal (CSI-RS) comprised of the information pertaining to received reference signaling, and to start using time/frequency resource element (TFRE) resources for regular data transmission for removing the beamforming state upon detecting whether certain beamforming states are less useful.

9. A method for operating a configuring node of a wireless communication network, the method comprising:

configuring a referencing node of the wireless communication network for:

reference signaling based on a beamforming state, wherein the referencing node is configured with a plurality of beamforming states of a transmitting node, and transmitting information pertaining to the reference signaling based on an indication of the beamforming state, wherein the indication of the beamforming state is based on the configuration of the referencing node; and changing between beamforming states of the plurality of beamforming states, wherein changing between the beamforming states comprises changing a direction of at least one beam, wherein the referencing node is reconfigured to stop measuring on corresponding interference measurement resources (IMRs) and channel state indicator-reference signal (CSI-RS) comprised of the information pertaining to received reference signaling, and to start using time/frequency resource element (TFRE) resources for regular data transmission for removing the beamforming state upon detecting whether certain beamforming states are less useful.

10. The method according to claim 9, further comprising configuring the referencing node for receiving the reference signaling.

11. A configuring node for a wireless communication network, the configuring node comprising:

a transmitter;

at least one processor operatively coupled to the transmitter; and at least one memory storing computer-executable instructions that, when executed by the at least one processor, adapt the configuring node to:

configure a referencing node for the wireless communication network for:

reference signaling based on a beamforming state, wherein the referencing node is configured with a plurality of beamforming states of a transmitting node, and transmitting information pertaining to the reference signaling based on an indication of the beamforming state, wherein the indication of the beamforming state is based on the configuration of the referencing node; and change between beamforming states of the plurality of beamforming states, wherein to change between the beamforming states, the configuring node is adapted to change a direction of at least one beam, wherein the referencing node is reconfigured to stop measuring on corresponding interference measurement resources (IMRs) and channel state indicator-reference signal (CSI-RS) comprised of the information pertaining to received reference signaling, and to start using time/frequency resource element (TFRE) resources for regular data transmission for removing the beamforming state upon detecting whether certain beamforming states are less useful.

12. The configuring node according to claim 11, wherein the referencing node is configured for receiving the reference signaling and/or with a reference measurement configuration.

* * * * *